July 30, 1968
C. A. TUCKER
3,394,599
POSITIVE FEED ADVANCING MECHANISM
Filed June 23, 1966
2 Sheets-Sheet 1
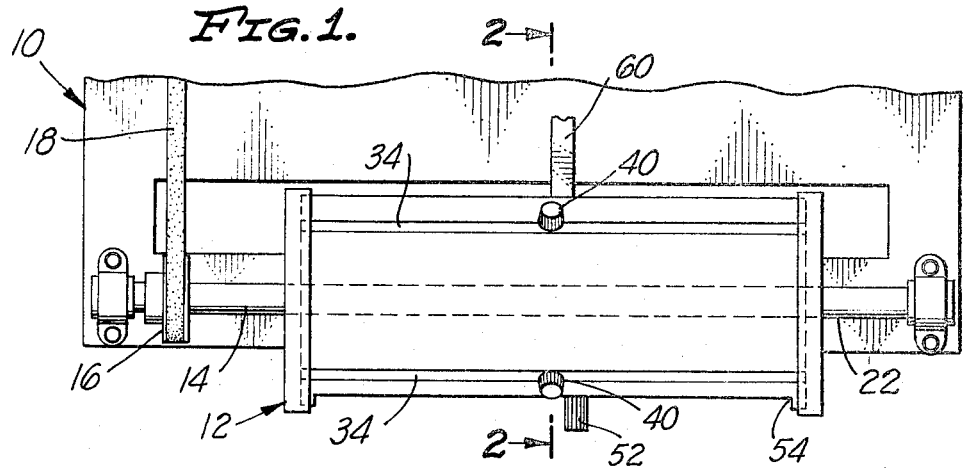
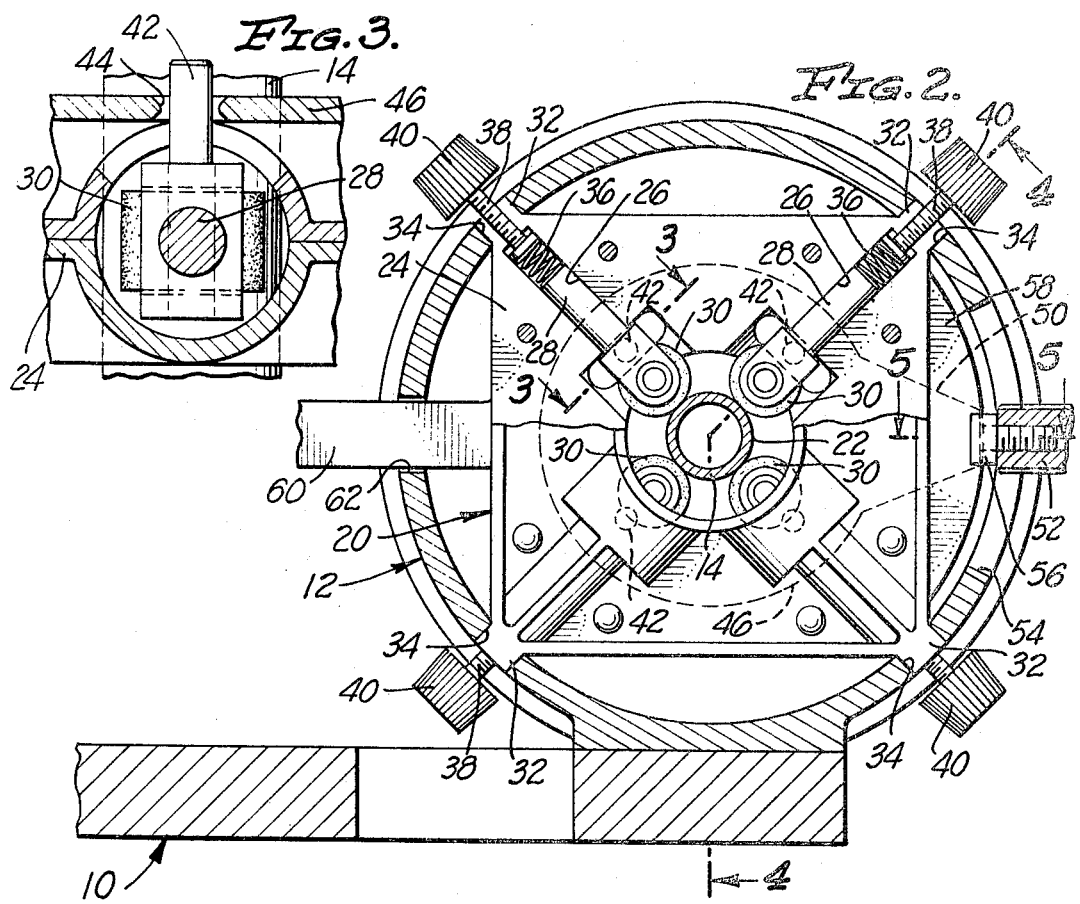
INVENTOR
COUNCIL A. TUCKER
BY
MAHONEY & HORNBAKER
ATTORNEYS July 30, 1968   C. A. TUCKER   3,394,599
POSITIVE FEED ADVANCING MECHANISM
Filed June 23, 1966   2 Sheets-Sheet 2
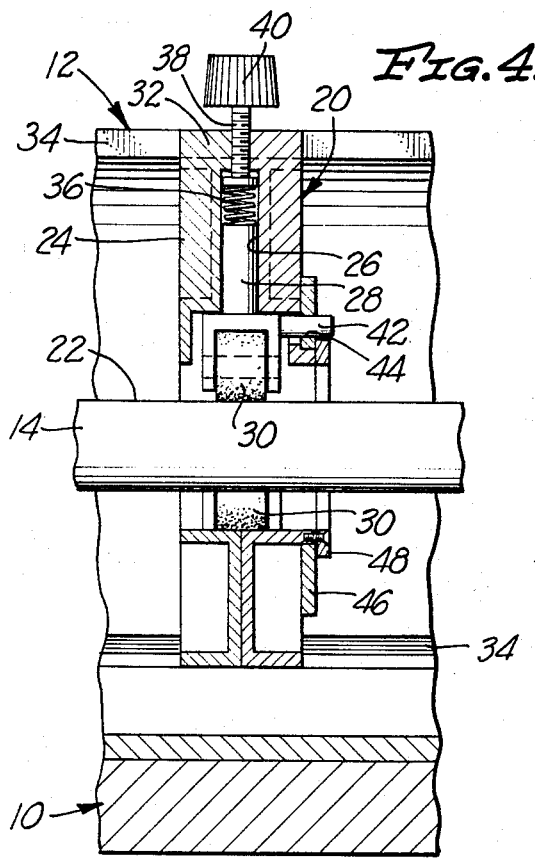
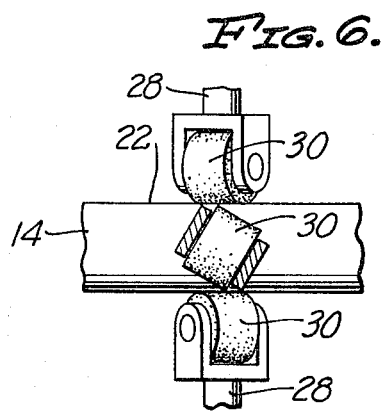
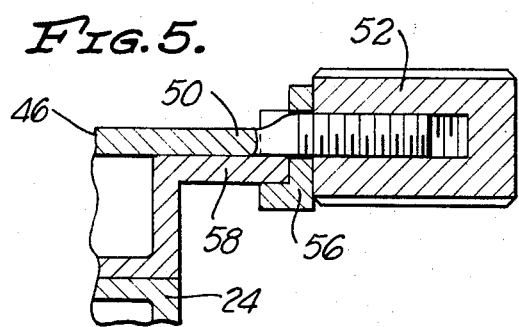
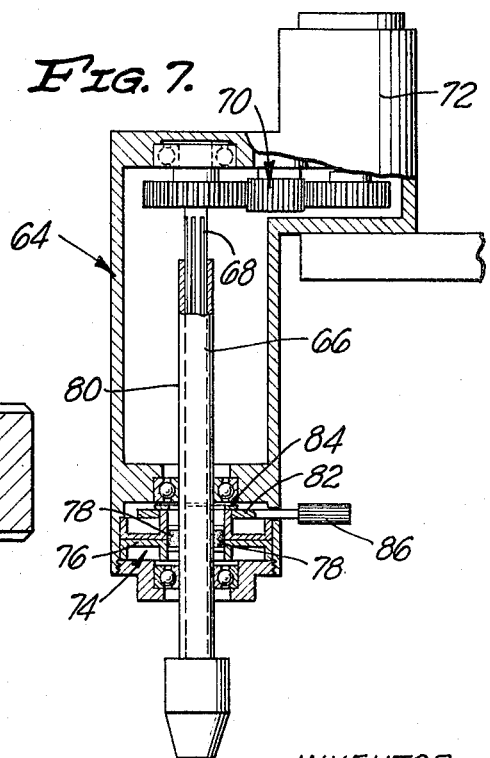
INVENTOR
COUNCIL A. TUCKER
BY
MAHONEY & HORNBAKER
ATTORNEYS United States Patent Office 3,394,599
Patented July 30, 1968

3,394,599
POSITIVE FEED ADVANCING MECHANISM
Council A. Tucker, 3200 Buckingham Road,
Glendale, Calif. 91206
Filed June 23, 1966, Ser. No. 559,860
14 Claims. (Cl. 74—25)

This invention relates to a positive feed advancing mechanism and more particularly, to a positive feed advancing mechanism which may be selectively adjusted for progressively advancing one member relative to another, such as advancing a cutting tool along a workpiece rotatably mounted in a lathe, or advancing a rotating drill spindle toward a workpiece at a uniform feed rate. Even more particularly, this invention relates to a positive feed advancing mechanism incorporating the principle of providing relative rotation between a cylindrical surface and roller means peripherally engaging said cylindrical surface, with the axis of the roller means being angled relative to the axis of the cylindrical surface so that axial urging is developed between the cylindrical surface and roller means to thereby axially move or feed one relative to the other.

Various prior forms of advancing mechanism have been provided, probably the most common forms being incorporated in power driven lathes and drills. For instance, in a lathe, a workpiece is rotated and a carriage is provided adjacent the workpiece for mounting a cutting tool and through various gear arrangements, the cutting tool is moved progressively along the workpiece to perform a particular cutting operation on the workpiece. In a drill, the drill spindle mounting the drill is continuously rotated, while various gearing arrangements are operably connected to the drill spindle for axially moving the drill spindle toward and away from a workpiece upon which the drilling operation is to be effected.

There are perhaps certain of the operations of this general type which require extremely precise feed advancing, and in these instances, which are of minimal occurrence, advancing mechanisms making use of precise gearing are required and the relatively high cost thereof can be justified. There are, however, many instances making up the large majority of occurrences where this exact and precise feed advancing is not required, and in such cases, the cost of providing feed advancing mechanisms incorporating expensive gearing has been unnecessary and in many cases prohibitive. Furthermore, where the feed advancing mechanism incorporates gearing, adjustment of the rate of feed advance becomes relatively difficult, and where this rate must be adjustable over a relatively wide range, the adjustment can only be provided in definite, predetermined steps requiring even more complicated gearing of still increased expense.

It is, therefore, an object of my invention to provide a positive feed advancing mechanism which may be incorporated in a wide variety of working tools and arrangements and which is relatively simple as compared to the prior feed advancing mechanisms. As hereinbefore pointed out, most of the feed advancing mechanisms in present day use have necessarily incorporated gearing arrangements which are relatively expensive to provide. According to the present invention, the positive feed advancing is obtained through relative rotation between a member having a cylindrical surface and roller means peripherally engaging the cylindrical surface, with the axis of the roller means being angled relative to the axis of the member so that axial urging is obtained between the member and roller means for the consequent feeding movement of one or the other.

It is another object of my invention to provide a positive feed advancing mechanism in which the rate of feed may be adjusted over a range of vitually infinitesimal increments within the maximum limitations of the particular mechanism. This is possible in view of the fact that the rate of feed advance is determined directly by the combination of the speed of relative rotation between the member cylindrical surface and the roller means peripherally engaging the surface, and the degree of angling between the axis of the roller means and the axis of the cylindrical surface. Thus, virtually an infinitesimal number of adjustments are provided throught the infinite number of possible adjustments in relative speed of rotation combined with the infinite number of possible adjustments in degree of axis angling.

It is still another object of my invention to provide a positive feed advancing mechanism which is completely versatile and may be incorporated in substantially the same form in a wide variety of positive feed advancing requirements. For instance, the feed advancing mechanism according to the present invention may be used to advance a cutting tool along a rotating workpiece mounted in a lathe, or may be used in conjunction with a drill spindle taking direct advantage of the rotation of the drill spindle to provide the advancing movement. Furthermore, the same feed advancing mechanism with only minimal alterations has been used by me in a unique electromechanical flight simulator for providing altitude variations of model aircraft according to my copending application entitled "Electro-mechanical Flight Simulator," Ser. No. 559,864, filed on an even date herewith.

Other objects and advantages of the invention will be apparent from the following specification and the accompanying drawings which are for the purpose of illustration only, and in which:

FIG. 1 is a fragmentary, top plan view showing an embodiment of the positive feed advancing mechanism according to the present invention arranged for providing a lateral positive feed advance to a lathe tool holder or other constructions of this general nature;

FIG. 2 is an enlarged, fragmentary, vertical, sectional view taken along the broken line 2—2 in FIG. 1;

FIG. 3 is an enlarged, fragmentary, sectional view taken along the broken line 3—3 in FIG. 2;

FIG. 4 is a fragmentary, sectional view taken along the broken line 4—4 in FIG. 2;

FIG. 5 is an enlarged, fragmentary, sectional view taken along the broken line 5—5 in FIG. 2;

FIG. 6 is a sectional view somewhat similar to FIG. 4, but with certain parts removed and illustrating the angular adjustment between the axes of the roller means and the axis of the advancing shaft in order to provide the feed advancing according to the principles of the present invention; and FIG. 7 is a vertical, sectional view of a second embodiment according to the principles of the present invention wherein the positive feed advancing mechanism is incorporated in a power driven drill for advancing the drill spindle toward and away from a workpiece.

As hereinbefore stated, the positive feed advancing mechanism according to the principles of the present invention, may be adapted to a wide variety of applications with only minor changes in arrangement. As illustrated by the first embodiment of the present application in FIGS. 1 through 6, the mechanism is adapted for laterally advancing a tool holder or similar device relative to a rotating workpiece mounted in a lathe, and as illustrated in the second embodiment of the present application in FIG. 7, the mechanism is adapted for vertically moving a drill spindle toward and away from a workpiece. Also as previously pointed out, this same positive feed advancing mechanism according to the present invention has been incorporated in a unique electromechanical flight simulator for controlling the altitude of model aircraft according to my said copending application, Ser. No. 559,864.

It is not intended, therefore, to limit the principles of the present invention to the particular constructions illustrated, but rather it is clearly apparent that the mechanism according to the principles of the present invention may be easily adapted to a wide variety of different applications wherein positive feed advancing is required or desider. Furthermore, it is clearly apparent that the direction of advancing, whether vertical, horizontal or any other direction is of little consequence and it is intended that the principles of the present invention will be broadly construed over a relatively wide scope within the limitations of the prior art.

Referring particularly to FIGS. 1 through 6, the first embodiment of the positive feed advancing mechanism according to the present invention is illustrated as including a main frame generally indicated at 10, which could form a part of a lathe bed (not shown) or a similar machine tool, and mounting a main housing generally indicated at 12. The mechanism main housing 12 is preferably hollow cylindrical and is mounted stationary on, and so as to form a part of, the main frame 10, with the main housing axially or laterally telescoping an advancing shaft 14 rotatably mounted on the main frame 10 and rotatably driven through a pulley 16 and drive belt 18 at selectively variable rotational speeds.

Adjustable roller mounting means generally indicated at 20 is positioned axially or laterally movable within the main housing 12 telescoped over and radially spaced from a cylindrical outer periphery 22 on the shaft 14. The roller mounting means 20 includes a roller mounting frame 24 having preferably four, equally circumferentially spaced and generally radially extending, pivot member openings 26 axially slidably and pivotally receiving pivot members 28. The pivot members 28 also, of course, extend generally radially and at the inner ends thereof rotatably mount resilient material rollers 30 peripherally engaging the shaft cylindrical outer periphery 22.

As shown in FIG. 2, the roller mounting frame 24 is generally square in configuration as viewed axially of the shaft 14 and is formed with four equally spaced projections 32 at the corners thereof laterally slidably received in lateral slots 34 extending the axial length of the main housing 12 so that the projections 32 serve as antirotation means for the roller mounting frame 24, while at the same time, permitting axial or lateral movement of the roller mounting frame. Coil compression springs 36 are positioned in the pivot member openings 26 resiliently compressively engaging the outer ends of the pivot members 28, with the springs being outwardly engaged by adjustment screws 38 threadably engaged through the projections 32 and having adjustment knobs 40 at the outer ends thereof.

As best seen in FIGS. 3 and 4, a pivot control pin 42 is operably connected to each of the pivot members 28 extending axially or laterally therefrom and received through connection openings 44 in a pivot control plate 46, with the pivot control plate being rotatably mounted on the roller mounting frame 24 by retainer plate 48 telescoped over and spaced from the shaft 14. Limited rotation of the pivot control plate 46 is regulated by a control arm 50 outward threadably receiving clamping nut 52 which extends through and is outwardly accessible from an enlarged, circumferentially and axially or laterally extending slot 54 in the main housing 12, with the clamping nut releasably clamping through a shoe 56 against an arcuate flange 58 on the roller mounting frame 24.

Thus, the rollers 30 may be uniformly pivoted through pivot members 28, pivot control pin 42 and pivot control plate 46 so that the axis of the rollers may be selectively and uniformly adjusted relative to the axis of the shaft 14. For instance, if the axes of the rollers 30 are exactly parallel to the axis of the shaft 14, the rotation of the shaft will cause rotation of the rollers but there will be no axial or latteral urging therebetween. If, however, the axes of the rollers 30 are uniformly angled through movement of the pivot control plate 46 relative to the axis of the shaft 14 in either direction, the rollers rather than circumscribing a perfectly circular path around the shaft, will describe a helical path around the shaft and thereby urge the roller mounting frame 24 axially or laterally along the shaft in one direction or the other dependent on the direction of angling.

Furthermore, the axial or lateral speed of movement of the roller mounting frame 24 will be dependent not only on the degree of angling of the axes of the rollers 30 relative to the axis of the shaft 14, but will also be dependent on the speed of rotation of the shaft so that this axial or lateral feed rate is dependent on the combination of the adjustment of the rollers and the speed of rotation of the shaft. Also, the force of feed movement of the roller mounting frame 24 along the shaft 14 will be determined by the force of peripheral engagement of the rollers 30 against the shaft outer periphery 22 and this force of engagement or abutment may be regulated, adjusted and changed through the adjustment knobs 40 accessible outwardly of the main housing 12.

To complete the mechanism in the particular arrangement illustrated, a tool holder 60 is secured to the roller mounting frame 24 and extends through a lateral slot 62 extending the axial length of the main housing 12. A usual cutting tool (not shown) may be mounted on the tool holder 60 in engagement with a workpiece (not shown) rotatably mounted in and driven by the lathe so that the cutting tool will be axially or laterally advanced according to the movement of the roller mounting frame 24 relative to the shaft 14.

In the second embodiment incorporating the positive feed advancing mechanism of the present invention illustrated in FIG. 7, the mechanism is incorporated in a drill having the main frame 64 axially movably and rotatably mounting a spindle 66, which is rotatably driven through a splined connection 68 and gears 70 by a drive motor 72 which is of variable speed type. A roller mounting means 74 is substantially the same as in the first embodiment previously described and includes a roller mounting frame 76 mounting rollers 78 peripherally rotatably engaged with a cylindrical outer periphery 80 of the spindle 66. Furthermore, the rollers 78 are pivotally adjustable so that the axes thereof may be uniformly adjusted relative to the axis of the spindle 66 through a pivot control plate 82 mounted for limited rotation relative to the roller mounting frame 76 by retainer plate 84, with the pivot control plate 82 being regulated by an adjustment knob 86.

The basic difference in this second embodiment of the positive feed advancing mechanism of the present invention is that the spindle 66 is axially movable relative to the roller mounting frame 76, while the roller mounting frame is mounted axially stationary in the main frame 64. Thus, when the rollers 78 are adjusted so that the axes thereof are uniformly angled relative to the axis of the spindle 66, the spindle will be urged axially upwardly or downwardly relative to the main frame 64 and therefore toward or away from a workpiece (not shown). Furthermore, the feeding movement of spindle 66 in one axial direction or the other will be determined by the adjusted rotational speed of the spindle, as well as the uniform angular adjustment of the rollers 78 so that any combination of spindle speed and roller adjustment may be taken advantage of to provide not only a desired drilling speed, but also an exact desired rate of spindle feed.

Thus, according to the principles of the present invention, I have provided a positive feed advancing mechanism which is relatively simple as compared to advancing mechanisms heretofore provided, yet one which provides definite advantages over any of the prior mechanisms. Obviously, the feed rate determining combination of the degree of uiform angular adjustment of the axes of the rollers 30 or 78 relative to the axis of the advancing shaft 14 or spindle 66, and the adjustment of the rotational speed of the advancing shaft or spindle is capable of virtually infinite variations so that the exact rate of feed may be provided. Also, it is obvious from the embodiments described, as well as the mechanisms shown in my said copending application, Ser. No. 559,864, that the mechanism of the present invention is capable of adaptation to a wide variety of applications with only minor alterations therein.

I claim:

1. In a positive feed advancing mechanism, the combination of: a frame; a shaft rotatably mounted on said frame; drive means operably connected for rotating said shaft; roller means peripherally engaging said shaft and rotatable through said shaft rotation; selectively adjustable roller mounting means mounting said roller means, the selective adjustment of said roller mounting means varying the angular relationship between the axis of said roller means and the axis of said shaft for varying axial urging between said roller means and said shaft axially along said shaft during said shaft rotation; means operably connecting one of said roller mounting means and shaft to said frame for axial movement relative to said frame according to said axial urging between said roller means and shaft; and means operably connected to said one of said roller mounting means and shaft for at least axial movement by said one of said roller mounting means and shaft.

2. A positive feed advancing mechanism as defined in claim 1 in which said means operably connecting said one of said roller mounting means and shaft to said frame includes means connecting said roller mounting means axially movable relative to said shaft and frame.

3. A positive feed advancing mechanism as defined in claim 1 in which there is means operably connected to said shaft for retaining said shaft axially stationary relative to said frame; and in which said means operably connecting said one of said roller mounting means and shaft to said frame includes means connecting said roller mounting means to said frame for axial movement relative to said frame.

4. A positive feed advancing mechanism as defined in claim 1 in which said means operably connecting one of said roller mounting means and shaft to said frame includes means operably connecting said shaft axially movable relative to said roller mounting means and frame.

5. A positive feed advancing mechanism as defined in claim 1 in which there is means operably connecting said roller mounting means to said frame stationary relative to said frame; and in which said means operably connecting said one of said roller mounting means and shaft includes means operably connecting said shaft to said frame axially movable relative to said frame.

6. A positive feed advancing mechanism as defined in claim 1 in which said roller means includes a series of rollers peripherally engaging said shaft at circumferentially spaced locations and simultaneously rotatable through said shaft rotation; and in which said adjustable roller mounting means mounts said rollers, the selective adjustment of said roller mounting means simultaneously and uniformly varying the angular relationship between the axes of said rollers and the axis of said shaft.

7. A positive feed advancing mechanism as defined in claim 1 in which said roller means includes a series of rollers peripherally engaging said shaft at circumferentially spaced locations and simultaneously rotatable through said shaft rotation; and in which said adjustable roller mounting means includes a series of pivot members mounting said rollers, housing means rotatably adjustably mounting said pivot members extending generally radially of said shaft, selectively movable adjustment means operably connected to said pivot members for maintaining said pivot members positioned with a uniform angular relationship between the axes of said rollers and the axis of said shaft, the selective movement of said adjustment means simultaneously and uniformly varying said angular relationship between said roller and shaft axes.

8. A positive feed advancing mechanism as defined in claim 1 in which said roller means includes a series of rollers peripherally engaging said shaft at circumferentially spaced locations and simultaneously rotatable through said shaft rotation; and in which said adjustable roller mounting means includes a series of pivot members mounting said rollers, housing means rotatably adjustably mounting said pivot members extending generally radially of said shaft, selectively movable adjustment means operably connected to said pivot members for maintaining said pivot members positioned with a uniform angular relationship between the axes of said rollers and the axis of said shaft, the selective movement of said adjustment means simultaneously and uniformly varying said angular relationship between said roller and shaft axes, selectively adjustable pressure abutment means operably connected to each of said pivot members resiliently urging said pivot members radially toward said shaft for maintaining said peripheral engagement of said rollers with said shaft, means for selectively adjusting said resilient urging of said pressure abutment means to vary the engagement pressure of said rollers with said shaft periphery.

9. A positive feed advancing mechanism as defined in claim 1 in which said roller means includes a series of rollers peripherally engaging said shaft at circumferentially spaced locations and simultaneously rotatable through said shaft rotation; and in which said adjustable roller mounting means includes a series of pivot members mounting said rollers, housing means rotatably adjustably mounting said pivot members extending generally radially of said shaft, selectively movable adjustment means operably connected to said pivot members for maintaining said pivot members positioned with a uniform angular relationship between the axes of said rollers and the axis of said shaft, the selective movement of said adjustment means simultaneously and uniformly varying said angular relationship between said roller and shaft axes, resilient means operably connected between each of said pivot members and said frame resiliently urging said pivot members toward said shaft for resiliently urging said pivot members toward said shaft for resiliently maintaining said rollers peripherally engaged with said shaft, selectively adjustable screw means operably engaged with said resilient means and actionable for varying the resilient urging of said resilient means against said pivot members.

10. In a positive feed advancing mechanism, the combination of: a frame; a member on said frame having a cylindrical surface; roller means peripherally engaging said member surface; selectively adjustable roller mounting means rotatably mounting said roller means on said frame, the selective adjustment of said roller mounting means varying the angular relationship between the axis of said roller means and the axis of said member surface for varying axial urging between said roller means and member upon relative rotation between said roller means and member; drive means for providing relative rotation between said roller means and said member; means operably connecting one of said roller mounting means and member to said frame for axial movement relative to said frame according to said axial urging between said roller means and member; and means operably connected to said one of said roller means and member for at least axial movement by said one of said roller means and member.

11. A positive feed advancing mechanism as defined in claim 10 in which said means operably connecting said one of said roller mounting means and member to said frame includes means connecting said roller mounting means axially movable relative to said member and frame.

12. A positive feed advancing mechanism as defined in claim 10 in which there is means operably connecting said member rotatable on and axially stationary relative to said frame; and in which said means operably connecting said one of said roller mounting means and member to said frame includes means connecting said roller mounting means to said frame for axial movement relative to said frame.

13. A positive feed advancing mechanism as defined in claim 10 in which said means operably connecting one of said roller mounting means and member to said frame includes means operably connecting said member axially movable relative to said roller mounting means and frame.

14. A positive feed advancing mechanism as defined in claim 10 in which there is means operably connecting said roller mounting means to said frame stationary relative to said frame; and in which said means operably connecting said one of said roller mounting means and member includes means operably connecting said member to said frame axially movable and rotatable relative to said frame.

References Cited

UNITED STATES PATENTS

| | | | |
|---|---|---|---|
| 1,713,678 | 5/1929 | Siebert | 51—215.7 |
| 2,619,346 | 11/1952 | Weathers | 74—25 |
| 2,940,322 | 6/1960 | Uhing | 74—25 |
| 3,272,021 | 9/1966 | Weber | 74—25 |

FRED C. MATTERN, JR., *Primary Examiner.*

W. S. RATLIFF, *Assistant Examiner.*